(12) United States Patent
Otsuka et al.

(10) Patent No.: US 7,208,108 B2
(45) Date of Patent: Apr. 24, 2007

(54) METHOD FOR PRODUCING POROUS CERAMIC ARTICLE

(75) Inventors: Aiko Otsuka, Nagoya (JP); Shuichi Ichikawa, Handa (JP); Takashi Harada, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 556 days.

(21) Appl. No.: 10/470,379

(22) PCT Filed: Dec. 6, 2002

(86) PCT No.: PCT/JP02/12803

§ 371 (c)(1),
(2), (4) Date: Jul. 28, 2003

(87) PCT Pub. No.: WO03/048073

PCT Pub. Date: Jun. 12, 2003

(65) Prior Publication Data

US 2004/0051196 A1   Mar. 18, 2004

(30) Foreign Application Priority Data

Dec. 7, 2001  (JP)  ............... 2001-373986
Jul. 12, 2002  (JP)  ............... 2002-204006

(51) Int. Cl.
*B29C 47/00* (2006.01)
*B01D 46/00* (2006.01)

(52) U.S. Cl. ............... 264/44; 264/211.11; 264/628; 264/177.12

(58) Field of Classification Search ........ 264/211, 264/211.11, 44, 630, 670, 628, 29.1, 177.12
See application file for complete search history.

(56) References Cited

U.S. PATENT DOCUMENTS

| | | | | |
|---|---|---|---|---|
| 4,162,285 A | * | 7/1979 | Tanabashi | .......... 264/630 |
| 4,279,849 A | * | 7/1981 | Ogawa et al. | .......... 264/631 |
| 6,309,590 B1 | * | 10/2001 | Obata et al. | .......... 264/630 |
| 6,764,742 B2 | * | 7/2004 | Ichikawa et al. | .......... 428/116 |
| 6,803,086 B2 | * | 10/2004 | Noguchi et al. | .......... 428/116 |
| 6,808,663 B2 | * | 10/2004 | Noguchi et al. | .......... 264/44 |
| 2002/0130447 A1 | * | 9/2002 | Beall et al. | .......... 264/630 |
| 2003/0047829 A1 | * | 3/2003 | Gadkaree | .......... 264/44 |
| 2003/0094716 A1 | * | 5/2003 | Gadkaree et al. | .......... 264/29.1 |

FOREIGN PATENT DOCUMENTS

| | | |
|---|---|---|
| JP | A 55-100269 | 7/1980 |
| JP | A 63-190779 | 8/1988 |
| JP | A 11-71188 | 3/1999 |
| JP | A 11-240778 | 9/1999 |
| JP | A 2001-293315 | 10/2001 |

* cited by examiner

*Primary Examiner*—Carlos Lopez
(74) *Attorney, Agent, or Firm*—Oliff & Berridge, PLC (57) ABSTRACT

A method for producing a porous ceramic article involves a step of kneading raw materials including a raw material for a ceramic and a processing aid, to prepare a body, a step of forming the body, to prepare a ceramic formed product, a step of drying the formed product, to prepare a ceramic dried article, and a step of firing the ceramic dried article, to preparing a porous ceramic article, characterized in that the processing aid is a starch having been subjected to a crosslinking treatment or a material comprising a starch having been subjected to a crosslinking treatment and a foamed resin. The method allows the production of a porous ceramic article which is suppressed in the deformation during drying and is excellent in dimensional accuracy.

12 Claims, 3 Drawing Sheets

X-AXIS DIRECTION

FIG.2(b)

X-AXIS DIRECTION

FIG.3(a)

X-AXIS

FIG.3(b)

METHOD FOR PRODUCING POROUS CERAMIC ARTICLE

TECHNICAL FIELD

The present invention relates to a method for producing a porous ceramic article. More particularly, the present invention relates to a method for producing a porous ceramic article excelling in dimensional accuracy by suppressing deformation during drying.

BACKGROUND ART

A porous ceramic article is widely used as a filter, catalyst carrier, and the like. More particularly, a porous ceramic article is used as an exhaust gas converter for a heat engine such as an internal combustion engine or for a combustion apparatus such as a boiler, a reformer of liquid fuel or gaseous fuel, a purification system for water or sewage, and the like. Many porous ceramic articles used in the above applications have a honeycomb structure to ensure a large processing area. These porous ceramic articles are generally obtained by adding a processing aid such as a pore-forming agent or a binder to a ceramic powder, kneading the powder mixture, forming the mixture in a prescribed form, and firing the formed product. The pore-forming agent is generally used to increase the number of pores and to control the size and volume of pores in the porous ceramic article.

Various materials functioning as the pore-forming agent have been proposed. For example, Japanese Patent Application Laid-open No. 55-100269 proposes a method for producing a cordierite honeycomb structure using starch powder. The Application discloses a method for producing a cordierite honeycomb structure, comprising mixing 100 parts by weight of a ceramic raw material to become cordierite by firing, 1–30 parts by weight of starch powder, a binder, and water, kneading the mixture, forming the kneaded product by extrusion molding, and drying and firing the formed product. The Application describes that starch powder is added to produce pores by firing. Specifically, starch powder leaves vacant spaces (pores) after incineration during firing. The numerous pores thus formed allow a large amount of catalyst to adhere, ensure a sufficient catalytic effect, and remarkably increase thermal shock resistance of the honeycomb structure.

As described in the Application, starch is excellent as a processing aid to form pores. However, use of starch causes deformation, or defects in shape in many cases, of the ceramic green body in the drying step after forming. Particularly, it may be difficult to obtain sufficient dimensional accuracy for a complicated form such as a honeycomb structure in which many cells are formed from intersecting thin walls. Therefore, to produce a porous ceramic article excelling in dimensional accuracy, a method of suppressing deformation in the drying step has been desired.

The porosity of a porous ceramic honeycomb structure used as an instrument for exhaust gas purification tends to further increase, since a decrease in pressure loss is requested. Therefore, the amount of pore-forming agent such as starch tends to increase. However, since an increase in the amount of pore-forming agent added is accompanied by an increase in calorific value during combustion of the pore-forming agent in the firing step, cracks may be easily formed in the ceramic article. This leads to difficulty in obtaining a nondefective porous ceramic article. In recent years, a foamed resin having a small calorific value has been preferably used as a pore-forming agent to produce a porous ceramic article having a high porosity. However, if the foamed resin alone is added as the pore-forming agent for a ceramic raw material having high hardness such as alumina or silicon carbide, a part of or a considerable amount of the foamed resin is crushed by the ceramic raw material during kneading. This causes a problem such as a decreased or nonuniform pore-forming effect. Therefore, it may be difficult to obtain a porous ceramic article having a desired porosity. Accordingly, a method for producing a porous ceramic article having a high porosity without producing cracks or the like in the firing step has been desired.

DISCLOSURE OF THE INVENTION

The present invention was made in view of such a situation. An object of the present invention is to provide a method for producing a porous ceramic article excelling in dimensional accuracy by suppressing deformation during drying. Another object of the present invention is to provide a method for producing a porous ceramic article excelling in dimensional accuracy by suppressing deformation during drying, wherein the porous ceramic article having a high porosity can be obtained while substantially no cracks are produced during firing.

The present invention provides a method for producing a porous ceramic article comprising a step of kneading raw materials including a ceramic raw material and a processing aid to prepare a clay body, a step of forming the clay body to prepare a ceramic green body, a step of drying the ceramic green body to prepare a ceramic dried article, and a step of firing the ceramic dried article to prepare a porous ceramic article, wherein the processing aid includes crosslinked starch.

In the present invention, the crosslinked starch is preferably used in an amount of 2–30 parts by mass for 100 parts by mass of the ceramic raw material, and preferably has an average particle size of 2–100 μm. Further, the processing aid in the present invention preferably includes a foamed resin in addition to the crosslinked starch. The foamed resin is added in an amount of preferably 0.5–10 parts by mass, and more preferably 1–5 parts by mass for 100 parts by mass of the ceramic raw material. The foamed resin is usually formed by covering a shell wall of resin with a water membrane. In this specification, the amount of foamed resin added refers to a mass not including the mass of water.

The average particle size of the foamed resin is preferably 2–200 μm, and more preferably 10–100 μm. The shell wall thickness of the foamed resin is preferably 0.01–1.0 μm, and more preferably 0.1–0.5 μm. The porous ceramic article preferably has a honeycomb structure. The ceramic raw material preferably contains one or more materials selected from the group consisting of a cordierite raw material, mullite, alumina, aluminum titanate, lithium aluminum silicate, silicon carbide, silicon nitride, and metal silicon as the main component. The raw material clay body preferably has hardness at 95° C. of 95% or more of hardness at 80° C.

BRIEF DESCRIPTION OF THE DRAWINGS

FIGS. 2(a) and 2(b) are schematic oblique views respectively showing a honeycomb segment which is another embodiment of the porous ceramic article produced according to the present invention and a honeycomb structure of the integrated honeycomb segments, wherein FIG. 2(a) is an oblique view showing the honeycomb segment and FIG. 2(b) is an oblique view of the honeycomb structure of the integrated honeycomb segments.

FIGS. 3(a) and 3(b) are schematic oblique views respectively showing a sealed honeycomb structure, wherein

BEST MODE FOR CARRYING OUT THE INVENTION

A method for producing a porous ceramic article of the present invention is described below in detail. However, the present invention is not limited to the following embodiment.

The method for producing a porous ceramic article of the present invention comprises a step of kneading raw materials including a ceramic raw material and a processing aid to prepare a clay body (hereinafter referred to as "clay body preparing step"), a step of forming the clay body to prepare a ceramic green body (hereinafter referred to as "forming step"), a step of drying the ceramic green body to prepare a ceramic dried article (hereinafter referred to as "drying step"), and a step of firing the ceramic dried article to prepare a porous ceramic article (hereinafter referred to as "firing step"). The present invention is particularly characterized in that the processing aid added to the raw materials in the clay body preparing step includes crosslinked starch or a mixture of crosslinked starch and a foamed resin.

If a clay body prepared by kneading the raw materials containing non-crosslinked starch as a processing aid is gradually heated from room temperature, hardness of the clay body increases until the temperature reaches around 80° C. However, hardness was found to decrease after a peak at around 80–90° C. The decrease in hardness (softening) of the clay body was found to cause deformation of the ceramic green body in the drying step. In addition, this decrease in hardness of the clay body was found to exactly coincide with the change in viscosity of the non-crosslinked starch. Specifically, the non-crosslinked starch does not exhibit a decrease in viscosity until the temperature reaches around 80° C., but exhibits a decrease in viscosity from a peak at around 80–90° C., when heated with water.

However, the crosslinked starch does not exhibit a decrease in viscosity from a peak at around 80–90° C. when heated with water. The clay body of the ceramic green body containing the crosslinked starch exhibits only a slight decrease in hardness. In some cases, the clay body exhibits even an increase in hardness. Since a decrease in hardness of the clay body at around 80–90° C. is substantially suppressed, deformation of the ceramic green body can be suppressed during drying. Use of the crosslinked starch as a processing aid exhibiting the pore-forming effect suppresses softening of the ceramic green body in the drying step. Therefore, a porous ceramic article with less deformation excelling in dimensional accuracy can be obtained.

The crosslinked starch of the present invention is obtained by crosslinking at least a part of molecules of starch to the extent that the crosslinked starch exhibits only a slight decrease in viscosity after a peak at 80–90° C. when heated with water as compared with the non-crosslinked starch and that the crosslinked starch does not cause deformation of the ceramic green body to the degree of producing a defective porous ceramic product. Preferably, viscosity of the crosslinked starch does not substantially decrease. There are no specific limitations to the method for crosslinking starch.

A method known in the art may be used. Specific examples of the crosslinked starch include starch crosslinked with phosphoric acid, starch crosslinked with epichlorohydrin, starch crosslinked with formaldehyde, starch crosslinked with acrolein, esterified starch, and etherified starch.

There are no specific limitations to the amount of crosslinked starch added. If the amount is too large, the calorific value during combustion of the crosslinked starch in the firing step is too large, whereby cracks may be easily produced. On the other hand, if the amount is too small, it is difficult to obtain a sufficient pore-forming effect. The amount of crosslinked starch added is preferably 1–30 parts by mass, and more preferably 5–20 parts by mass for 100 parts by mass of the ceramic raw material.

The processing aid of the present invention preferably includes, in addition to the crosslinked starch, a pore-forming agent having a combustion temperature range different from that of the crosslinked starch.

Use of the processing aid including, in addition to the crosslinked starch, the pore-forming agent having a different combustion temperature range can produce a porous ceramic article having a high porosity, while suppressing production of cracks.

As the pore-forming agent having a different combustion temperature range used together with the crosslinked starch, a foamed resin with a small resin content and a low calorific value is preferable.

If the crosslinked starch is used together with the foamed resin, production of cracks in the firing step can be suppressed, and a porous ceramic article having a remarkably high porosity which is fully appropriate for a porous ceramic honeycomb structure used as an exhaust gas converter in recent years can be produced.

The porosity can increase only to a limited extent if the crosslinked starch alone is used as the pore-forming agent, because the non-crosslinked starch may easily produce cracks if added in excess of the above-described amount. On the other hand, if only a foamed resin is added as the pore-forming agent to a ceramic raw material having high hardness such as alumina or silicon carbide, the foamed resin is crushed by the ceramic raw material during kneading in the clay body preparing step, whereby the pore-forming effect decreases.

However, use of the crosslinked starch and the foamed resin in combination decreases the calorific value during combustion of the pore-forming agents, and suppresses production of cracks due to the difference in combustion temperature between the pore-forming agents and crushing of the foamed resin, whereby the foamed resin can exhibit its essential pore-forming effect. Therefore, a porous ceramic article having a remarkably high porosity excelling in dimensional accuracy can be obtained. The reasons for a decrease in crushing of the foamed resin are not necessarily clear. However, it may be suggested that the crosslinked starch has some protective effect on the foamed resin.

The amount of foamed resin added is preferably 0.5–10 parts by mass, and more preferably 1–5 parts by mass for 100 parts by mass of the ceramic raw material. If the amount of foamed resin added is less than 0.5 part by mass, the porosity does not sufficiently increase. If more than 10 parts by mass, it is difficult to solidify the clay body, whereby processing efficiency decreases.

There are no specific limitations to the particle size of the crosslinked starch or the foamed resin. However, if the particle size is too small, the crosslinked starch or the foamed resin is filled in the voids formed between the ceramic raw material powders, whereby the pore-forming effect decreases. If the particle size of the crosslinked starch is too large, formability of the ceramic green body decreases. If the particle size of the foamed resin is too large, the foamed resin may be easily crushed, whereby the pore-forming effect decreases. The average particle size of the crosslinked starch is preferably 2–100 μm, and more preferably 10–60 μm. The average particle size of the foamed resin is preferably 2–200 μm, and more preferably 10–100 μm. The above particle size is determined using a laser diffraction granulometer.

In the present invention, raw materials including the crosslinked starch or a mixture of the crosslinked starch and the foamed resin and a ceramic raw material are first kneaded to prepare a clay body in the clay body preparing step. There are no specific limitations to the ceramic raw material inasmuch as the material is a ceramic which can be formed in a prescribed form by firing or a substance to become a ceramic with a prescribed form by firing. As the ceramic raw material, one or more materials selected from the group consisting of a cordierite raw material, mullite, alumina, aluminum titanate, lithium aluminum silicate, spinel, silicon carbide, metal silicon, silicon nitride, and the like can be used, for example.

The cordierite raw material is preferably the main component from the viewpoint of thermal shock resistance. The cordierite raw material refers to cordierite itself and/or a material that can form cordierite by firing. The material that can form cordierite by firing comprises talc, kaolin, fired kaolin, alumina, aluminum hydroxide, and silica, for example, at a proportion to provide a chemical composition of 42–56 mass % of $SiO_2$, 30–45 mass % of $Al_2O_3$, and 12–16 mass % of MgO. The main component herein refers to a component making up 50 mass % or more, preferably 70 mass % or more, and more preferably 80 mass % or more of the ceramic raw material.

As the main component, silicon carbide or a mixture of silicon carbide and metal silicon is preferable from the viewpoint of thermal resistance. When metal silicon (Si) and silicon carbide (SiC) are used as the main component of the ceramic raw material, if the Si content expressed by the formula Si/(Si+SiC) is too small, the effect of Si addition is not easily achieved, and if the Si content exceeds 50 mass %, high thermal resistance and high thermal shock resistance which are characteristic of SiC are not easily achieved. The Si content is preferably 5–50 mass %, and more preferably 10–40 mass %.

The processing aid may include, in addition to the crosslinked starch and the foamed resin, one or more of other pore-forming agents such as graphite, phenol resin, foaming resin (a resin to be foamed), polymethyl methacrylate, polyethylene, and polyethylene terephthalate. The processing aid may also include one or more of binders such as celluloses such as methylcellulose, hydroxypropoxyl methylcellulose, hydroxyethylcellulose, and carboxymethylcellulose, and polyvinyl alcohol. Among these, methylcellulose and/or hydroxypropoxyl methylcellulose are preferably used, if extrusion molding is employed in the forming step. A dispersant such as ethylene glycol, dextrin, fatty acid soap, or polyalcohol may be further added. Moreover, a liquid medium such as water is preferably added.

There are no specific limitations to the method for kneading the raw materials in the clay body preparing step of the present invention. A common kneader, pressure kneader, uniaxial continuous extruder, biaxial continuous kneading extruder, vacuum pugmill, or the like may be used. The raw materials are kneaded using such a kneader to prepare a clay body. However, if a clay body prepared by kneading raw materials using a common kneader, pressure kneader, or the like not involving a vacuum process is further kneaded using a vacuum pugmill, such a clay body contains less or no bubbles and has improved plasticity.

In the present invention, the clay body made from the raw materials has a ratio of hardness at 95° C. to hardness at 80° C. (hereinafter referred to as "hardness ratio") of 95% or more, assuming that hardness at 80° C. is 100%. Hardness ratio is more preferably 100% or more, specifically, hardness at 95° C. is over hardness at 80° C. Most preferably, hardness ratio exceeds 100%. These conditions further suppress deformation of the ceramic green body in the drying step, whereby the porous ceramic article finally produced have more increased dimensional accuracy. In order to examine essential properties of the clay body, hardness is measured for a clay body prepared by being finally kneaded using a kneader involving a vacuum process such as a vacuum pugmill.

The prepared clay body is formed in a prescribed form in the forming step. There are no specific limitations to the method for forming the clay body in the forming step. Conventional methods such as extrusion molding, injection molding, and jiggering may be used. Extrusion molding is preferably used for forming a honeycomb structure. An extruder which can simultaneously prepare and form the clay body such as a biaxial continuous kneading extruder is preferably used to continuously perform the clay body preparing step and the forming step. In this case, the forming step is performed when the raw materials which have become the clay body in the extruder are extruded through a die.

Figure 1:
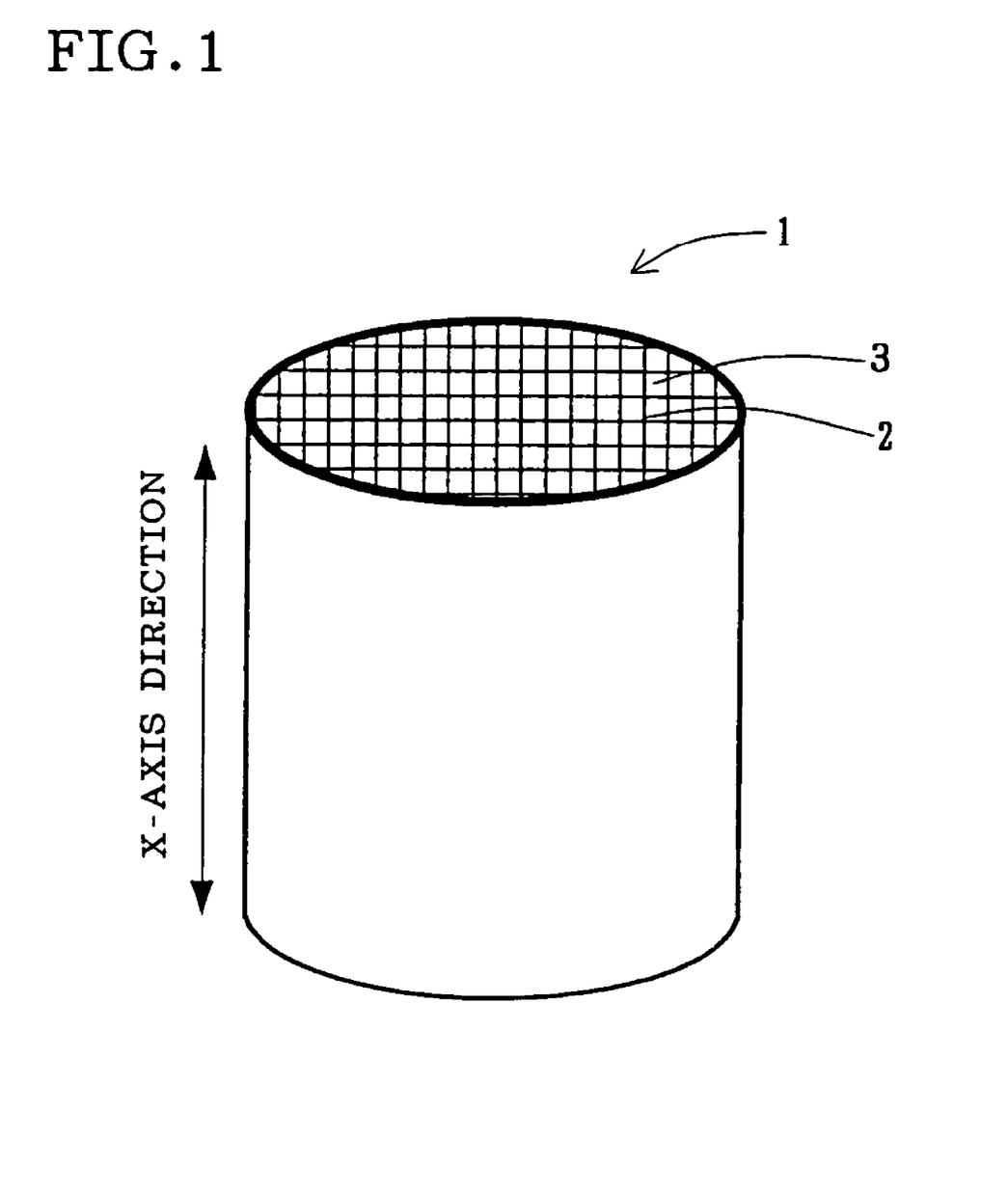
FIG. 1 is a schematic oblique view showing a honeycomb structure which is one embodiment of the porous ceramic article produced according to the present invention.
Figure 2A:
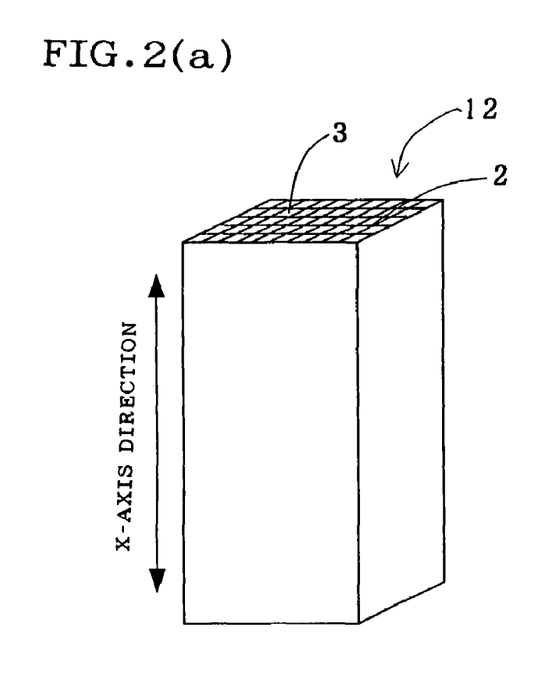
Figure 2B:
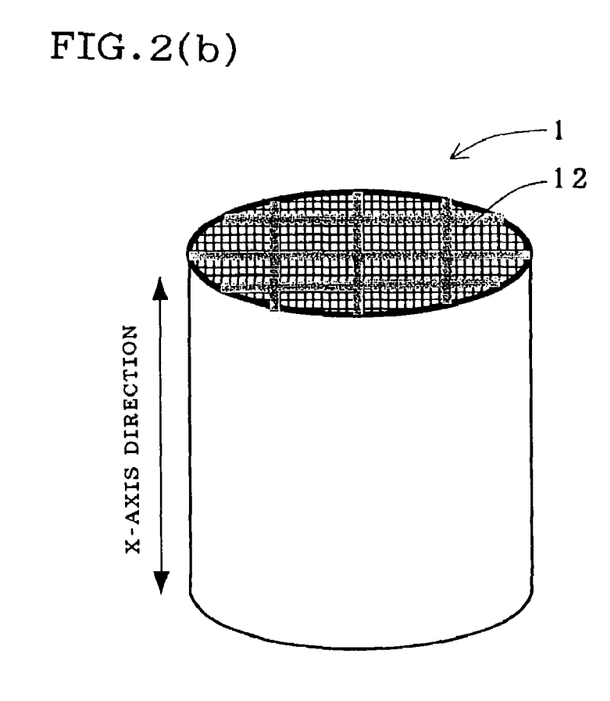

There are no specific limitations to the form of the ceramic green body formed in the forming step. For example, a honeycomb structure 1 having a structure shown in FIG. 1 is preferable. The honeycomb structure 1 has a number of through-holes 3 passing through the structure 1 in an X-axis direction partitioned by partitions 2 and is suitable for a filter or a catalyst carrier. As shown in FIG. 2(b), the honeycomb structure 1 produced by integrating a plurality of honeycomb segments 12 can preferably suppress production of cracks due to thermal stress. Therefore, the honeycomb segments 12 as in FIG. 2(a) are preferably formed in the forming step.

Second, the ceramic green body prepared in the forming step is dried in the drying step. The drying step removes moisture, liquid medium, and the like contained in the ceramic green body. There are no specific limitations to the drying method. Hot air drying, microwave drying, dielectric drying, reduced pressure drying, vacuum drying, or the like is usually employed. The drying step using hot air drying and microwave drying or dielectric drying in combination is preferable, since the entire green body can be rapidly and uniformly dried. The drying temperature when using hot air drying is preferably 80–150° C. to ensure rapid drying. Any of the above driers causes a temperature fluctuation to some extent, for example, in the range of 80–100° C. This temperature fluctuation may cause deformation of the green body containing the non-crosslinked starch. However, since the method of the present invention employs the crosslinked starch, deformation of the green body can be effectively suppressed.

Third, the ceramic dried article prepared in the drying step is fired in the firing step to prepare the porous ceramic article. The firing temperature and the firing atmosphere vary according to the ceramic raw material. A person skilled in the art can select the firing temperature and firing atmosphere suitable for the selected ceramic raw material. An oxide material such as a cordierite raw material or mullite is preferably fired in air, for example. The cordierite raw material is preferably fired at 1, 400–1,440° C. A nonoxide such as silicon carbide or silicon nitride is preferably fired in a nonoxidizing atmosphere such as nitrogen or argon. Silicon carbide is preferably fired at 1,400–1,800° C. when bonded with metal silicon, and at 1,550–1,800° C. when bonded with silicon nitride or the like. Silicon carbide powders must be fired at 1,800° C. or more to bond themselves by recrystallization. Metal silicon is preferably fired in a nitrogen atmosphere at 1,200–1,600° C. to produce silicon nitride. In this firing step, the pore-forming agents such as the crosslinked starch burn and produce heat. Combined use of the crosslinked starch and the foamed resin can suppress defects such as production of cracks, because of the difference in combustion temperature and the small calorific value of the foamed resin.

Figure 3A:
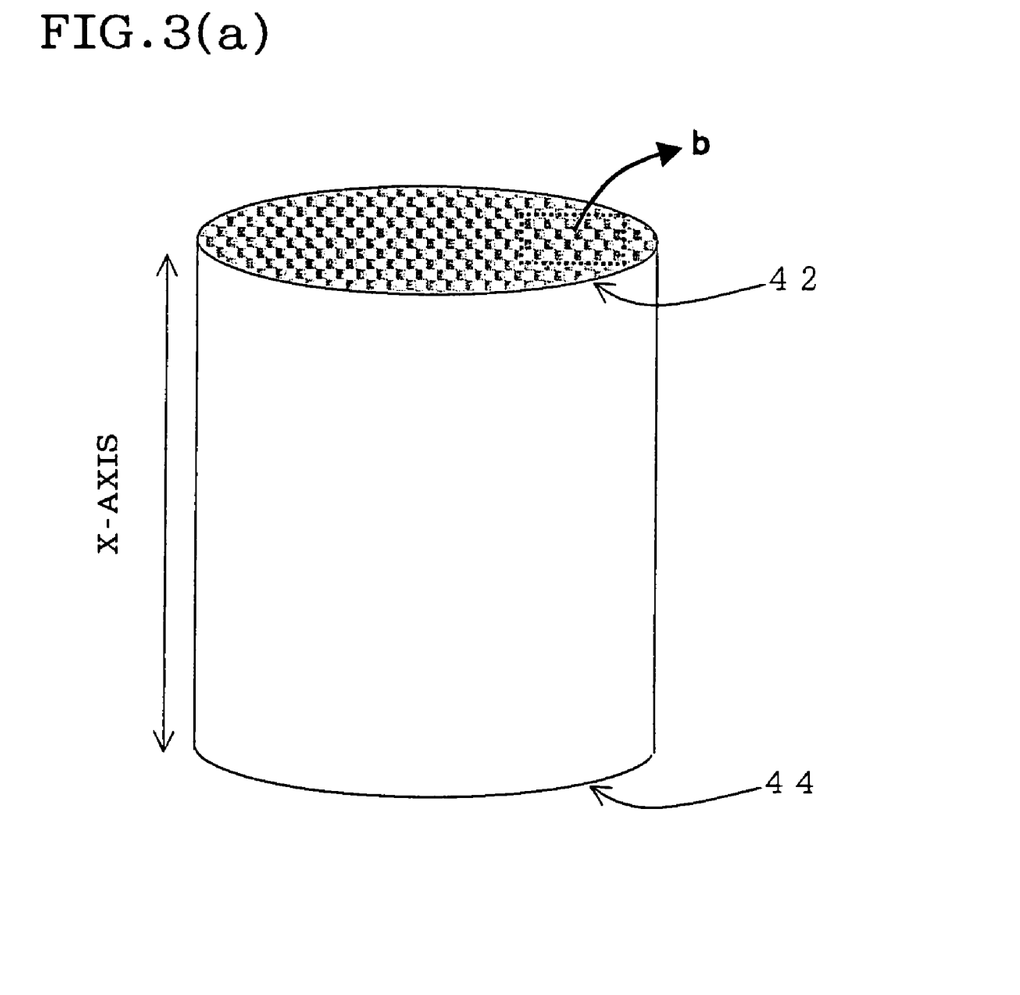
FIG. 3(a) is a schematic oblique view showing the sealed upper portion of the honeycomb structure and FIG. 3(b) is a partially enlarged view of the portion b in FIG. 3(a).
Figure 3B:
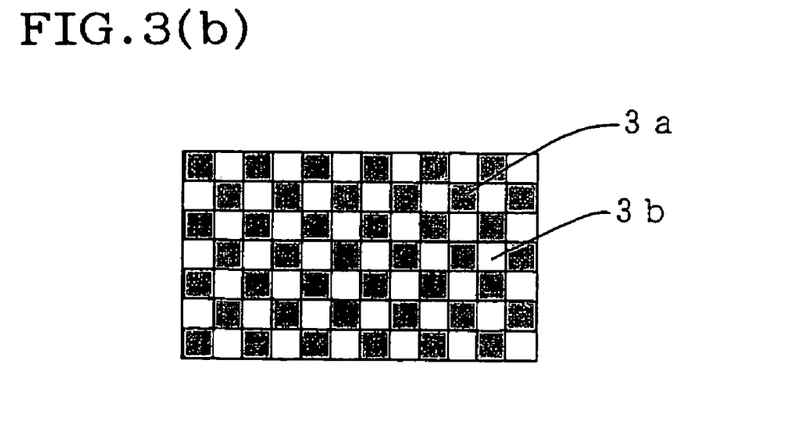

If the porous ceramic article of the present invention having a honeycomb structure is used as a filter such as a diesel particulate filter (hereinafter referred to as "DPF"), as shown in FIG. 3(a) and FIG. 3(b) which is a partially enlarged view of FIG. 3(a), it is preferable that the openings of specific through-holes 3a be sealed at one edge 42 and the openings of remaining through-holes 3b be sealed at the other edge 44. In such a configuration, if the honeycomb structure is used as a filter, fluid to be processed flows into the through-holes 3b opening at one edge 42, passes through the porous partitions 2, and is discharged from the through-holes 3a opening at the other edge 44. In this instance, the partitions 2 function as a filter and ensure a large filtration area.

Sealing can be performed by masking the through-holes not to be sealed, providing a slurry raw material used for sealing at the opening edge of the honeycomb segments, and firing the slurry after drying. Sealing is preferably performed after the forming step and before the firing step in the method for producing the porous ceramic article, whereby the firing step does not have to be repeated. However, sealing may be performed after the firing step. Sealing can be performed any time after the forming step. The raw material used for sealing can be appropriately selected from the above-described preferable ceramic raw materials. A raw material the same as the ceramic raw material is preferable.

If the porous ceramic article is produced by integrating a plurality of the honeycomb segments 12 as shown in FIGS. 2(a) and 2(b), a plurality of the honeycomb segments as in FIG. 2(a) and, optionally, a plurality of honeycomb segments corresponding to the outer circumference of the honeycomb structure, are produced, and these honeycomb segments are bound using a binder such as ceramic cement, cured by drying at around 200° C., and optionally, processed by grinding in a prescribed form, whereby the honeycomb structure can be obtained. Preferable binders may include a material selected from the group of the materials suitably used as the main component of the honeycomb structure. If the difference in a thermal expansion coefficient between the binder and the honeycomb segments is too large, thermal stress is focused on the joint section during heating or cooling. The difference in the thermal expansion coefficient between the binder and the honeycomb segments at 20–800° C. is preferably $1.5 \times 10^{-6}/°$ C. or less.

When the honeycomb structure is produced by integrating the honeycomb segments, the cross-sectional area of each honeycomb segment is preferably 900–62,500 mm$^2$, and more preferably 2,500–40,000 mm$^2$. The cross-sectional area of each honeycomb segment of which the main component is alumina or silicon carbide having a high thermal expansion coefficient and low thermal shock resistance is preferably 900–10,000 mm$^2$, and more preferably 900–5,000 mm$^2$. Irrespective of types of honeycomb segments, the honeycomb segments having the above cross-sectional area preferably make up 70 vol % or more of the honeycomb structure before circumference processing.

If the porous ceramic article produced according to the present invention is used as a catalyst carrier to purify exhaust gas in a heat engine such as an internal combustion engine or a combustion apparatus such as a boiler, or to reform liquid fuel or gaseous fuel, a catalyst, for example, a metal having catalytic functions, is preferably carried on the porous ceramic article. A method known in the art for causing a catalyst to be carried on the porous ceramic article may be used. For example, the porous ceramic article is washcoated with a catalyst slurry, dried, and fired to cause the catalyst to be carried thereon. Examples of a representative metal having catalytic functions include Pt, Pd, and Rh. At least one of these metals is preferably carried on the porous ceramic article.

The porous ceramic article produced according to the present invention has internal pores. There are no specific limitations to the porosity and the pore diameter. The porosity and the pore diameter are appropriately selected according to the application.

The porosity is preferably 30–90% when using the porous ceramic article as DPF, for example. If the porosity is less than 30%, the pressure loss is too large. If more than 90%, the ceramic article has insufficient strength. When the porous ceramic article is used as a filter requiring a low pressure loss such as a filter which carries a catalyst thereon to continuously incinerate particulates, the porosity is preferably 50–90%, more preferably 50–80%, and particularly preferably 53–70%. When the porous ceramic article is used as a filter carrying a catalyst thereon, since pressure loss increases due to the catalyst carried, the porosity must be set at a high level beforehand. If the porosity is less than 50%, the pressure loss in this type of filter increases. If the porosity exceeds 90%, strength of the ceramic article is insufficient. When the main component of the porous ceramic article is silicon carbide or a mixture of silicon carbide and metal silicon, the porosity and the thermal conductivity are, respectively, preferably 50–90% and 5–30 W/mK, more preferably 50–80% and 7–28 W/mK, and particularly preferably 53–70% and 9–25 W/mK.

The pore diameter is preferably 2–50 μm when using the porous ceramic article as DPF. An average pore diameter of less than 2 μm easily leads to an increase in pressure loss, even if a small amount of particulates is deposited. If the average pore diameter is more than 50 μm, particulates tend to remain unfiltered.

There are no specific limitations to the thickness of the partitions of the honeycomb structure shown in any one of FIGS. 1–3 showing the porous ceramic article produced according to the present invention. However, if the partitions are too thick, pressure loss is too large when fluid to be processed passes through the porous partitions. If the partitions are too thin, strength of the partitions is insufficient. The thickness of the partitions is preferably 30–2,000 μm, more preferably 40–1,000 μm, and most preferably 50–500 μm. There are no specific limitations to the cell density (the number of through-holes per unit cross-sectional area). However, if the cell density is too small, strength and effective GSA (geometric surface area) of the honeycomb structure are insufficient. If the cell density is too large, pressure loss is large when the fluid to be processed passes through the through-holes. The cell density is preferably 6–2,000 cells/in² (0.9–311 cells/cm²), more preferably 50–1,000 cells/in² (7.8–155 cells/cm²), and most preferably 100–400 cells/in² (15.5–62.0 cells/cm²). There are no specific limitations to the form of cross-section of the through-holes (the cell form). From the viewpoint of production, the cell form is preferably triangular, quadrangular, hexagonal, or corrugated. The cell form of DPF of which the through-holes are alternately sealed at the edge of the honeycomb structure is preferably triangular or quadrangular, taking the filter area into consideration. There are no specific limitations to the cross-sectional form of the honeycomb structure. The cross-sectional form may be circular as in FIG. 1, oval, race track-like, elliptical, polygonal such as triangular, quasitriangular, quadrangular, or quasiquadrangular, or deformed.

EXAMPLES

The present invention is described below in more detail by examples. However, the present invention is not limited to the following examples.

Example 1

To a mixture of 100 parts by mass of a ceramic raw material consisting of 75 mass % of silicon carbide and 25 mass % of metal silicon and 10 parts by mass of crosslinked starch with an average particle size of 45 μm, methylcellulose, hydroxypropoxyl methylcellulose, a surfactant, and water were added and mixed to prepare a plastic clay body using a vacuum pugmill. This clay body was formed by extrusion molding to prepare a ceramic green body. This ceramic green body was dried using microwave drying and hot air drying in combination, calcinated at 400° C. in air, and fired at around 1,450° C. in an inert atmosphere of argon to prepare a porous ceramic article of a metal silicon-silicon carbide composite material in which Si was bonded with SiC, having a honeycomb structure with a partition thickness of 380 μm, a cell density of 31.0 cells/cm² (200 cells/in²), one side of the square cross-section of 35 mm, and a length of 152 mm.

Examples 2–10

Porous ceramic articles of a honeycomb structure were produced using the raw materials and method the same as in Example 1 except that the amount and average particle size of the crosslinked starch were as shown in Table 1. In Example 10, low-crosslinked starch was used.

Example 11

As a ceramic raw material, a mixture of talc, kaolin, alumina, aluminum hydroxide, and silica having a cordierite composition was provided. To a mixture of 100 parts by mass of the ceramic raw material and 10 parts by mass of crosslinked starch with an average particle size of 45 μm, methylcellulose, hydroxypropoxyl methylcellulose, a surfactant, and water were added and mixed to prepare a plastic clay body using a vacuum pugmill. This clay body was formed by extrusion molding to prepare a ceramic green body. This ceramic green body was dried using dielectric drying and hot air drying in combination and fired at around 1,420° C. in air to prepare a porous ceramic article of cordierite having a honeycomb structure with a partition thickness of 300 μm, a cell density of 46.5 cells/cm² (300 cells/in²), an outer diameter of 144 mm, and a length of 152 mm.

Examples 12–13

Porous ceramic articles of a honeycomb structure were produced using the raw materials and method the same as in Example 11 except that the amount and average particle size of the crosslinked starch were as shown in Table 1.

Examples 14–20 and 23–25

Porous ceramic articles of a honeycomb structure were produced using the raw materials and method the same as in Example 1 except that the amount and average particle size of the crosslinked starch and the foamed resin were as shown in Table 2.

Examples 21–22

Porous ceramic articles of a honeycomb structure were produced using the raw materials and method the same as in Example 11 except that the amount and average particle size of the crosslinked starch and the foamed resin were as shown in Table 2.

Comparative Example 1

A porous ceramic article of a honeycomb structure was produced using the raw materials and method the same as in Example 1 except that non-crosslinked starch was used instead of the crosslinked starch.

Comparative Example 2

A porous ceramic article of a honeycomb structure was produced using the raw materials and method the same as in Example 1 except that starch was not used.

Comparative Example 3

A porous ceramic article of a honeycomb structure was produced using the raw materials and method the same as in Example 1 except that the crosslinked starch was not used and that the amount and average particle size of the foamed resin were as shown in Table 2.

Evaluation

The porous ceramic articles obtained in Examples 1–25 and Comparative Examples 1–3 were evaluated as follows. The results were shown in Tables 1 and 2.

(1) Hardness

Hardness at 95° C. and at 80° C. of the plastic clay body prepared using a vacuum pugmill was measured using a NGK hardness tester. The ratio (%) of hardness at 95° C. to hardness at 80° C. was determined as hardness ratio, assuming that hardness at 80° C. was 100%.

(2) Deformation

The green body in the drying step was observed by naked eye observation to identify whether or not deformation occurred. If deformation occurred, the extent of deformation was also evaluated.

(3) Porosity

The porosity of the porous ceramic articles was measured using mercury porosimeter. The rate of increase in porosity of the porous ceramic articles containing the crosslinked starch as compared with the porous ceramic article not containing the crosslinked starch (Comparative Example 2) was determined.

(4) Cracks

The porous ceramic articles were observed using an optical microscope to identify whether or not cracks were present.

TABLE 1

| No. | Ceramic raw material | Type and amount of starch | | | Hardness ratio (%) | Deformation during drying | Rate of increase in porosity by starch (%) | Cracks in fired body |
| | | Crosslinked or non-crosslinked | Amount (parts by mass) | Average particle size (μm) | | | | |
|---|---|---|---|---|---|---|---|---|
| Example 1 | SiC: 75% + Si: 25% | Crosslinked | 10 | 45 | 104 | None | 5 | None |
| Example 2 | SiC: 75% + Si: 25% | Crosslinked | 2 | 45 | 103 | None | 1 | None |
| Example 3 | SiC: 75% + Si: 25% | Crosslinked | 30 | 45 | 100 | None | 15 | None |
| Example 4 | SiC: 75% + Si: 25% | Crosslinked | 5 | 2 | 102 | None | 1 | None |
| Example 5 | SiC: 75% + Si: 25% | Crosslinked | 10 | 10 | 100 | None | 4 | None |
| Example 6 | SiC: 75% + Si: 25% | Crosslinked | 10 | 60 | 98 | None | 5 | None |
| Example 7 | SiC: 75% + Si: 25% | Crosslinked | 20 | 100 | 95 | None | 12 | None |
| Example 8 | SiC: 75% + Si: 25% | Crosslinked | 10 | 15 | 99 | None | 5 | None |
| Example 9 | SiC: 75% + Si: 25% | Crosslinked | 35 | 10 | 101 | None | 12 | Present |
| Example 10 | SiC: 75% + Si: 25% | Crosslinked (low-crosslinked) | 15 | 45 | 94 | Small | 5 | None |
| Example 11 | Cordierite raw material | Crosslinked | 10 | 45 | 104 | None | 7 | None |
| Example 12 | Cordierite raw material | Crosslinked | 10 | 15 | 101 | None | 7 | None |
| Example 13 | Cordierite raw material | Crosslinked | 1 | 15 | 105 | None | 0.5 | None |
| Comparative Example 1 | SiC: 75% + Si: 25% | Non-crosslinked | 10 | 45 | 91 | Large | 5 | None |
| Comparative Example 2 | SiC: 75% + Si: 25% | — | 0 | — | 107 | None | 0 | None |

The porous ceramic articles of Examples 1–13 exhibited less or no deformation in the drying step as compared with that of Comparative Example 1. Specifically, the effect of suppressing deformation during drying was confirmed in these porous ceramic articles. The porous ceramic articles of Examples 1–13 also exhibited an increased porosity as compared with those of Comparative Example 2. Specifically, the pore-forming effect was confirmed in these porous ceramic articles. Particularly, the porous ceramic articles of Examples 1–8 and 10–12 exhibited neither deformation during drying nor cracks after firing. Moreover, the pore-forming effect by adding starch was confirmed in these porous ceramic articles. Since the amount of crosslinked starch added was small in the porous ceramic article of Example 13, the effect of increasing the porosity was smaller than those of the other Examples. On the other hand, cracks were produced in the porous ceramic article of Example 9 due to a large amount of the crosslinked starch. In Example 10, since hardness at 95° C. of the clay body was lower than 95% of hardness at 80° C., the effect of suppressing deformation during drying was small.

The porous ceramic articles of Examples 14–25 exhibited less or no deformation in the drying step as compared with that of Comparative Example 1. Specifically, the effect of suppressing deformation during drying was confirmed in these porous ceramic articles. The porous ceramic articles of Examples 14–25 exhibited an increased porosity as compared with those of Examples 1, 5, 11, and the like in which the amount and average particle size of starch were the same as those of Examples 14–25. Specifically, the pore-forming effect was significantly large. Crushing of the foamed resin in the porous ceramic articles of Examples 14–25 in the clay body preparing step was little as compared with the porous ceramic article of Comparative Example 3 in which crosslinked resin was not added. Specifically, the effect of increasing the porosity was large in these porous ceramic articles.

When 0.5 part by mass or more of the foamed resin was added to 100 parts by mass of the ceramic raw material, the effect of increasing the porosity by the foamed resin was obtained. When 1.0 part by mass or more, the effect of increasing the porosity further increased. However, in

TABLE 2

| No. | Ceramic raw material | Type and amount of starch | | | Particle size and amount of foamed resin | | Hardness ratio (%) | Deformation during drying | Rate of increase in porosity by starch (%) | Cracks in fired body |
| | | Crosslinked or non-crosslinked | Amount (parts by mass) | Average particle size (μm) | Amount (parts by mass) | Average particle size (μm) | | | | |
|---|---|---|---|---|---|---|---|---|---|---|
| Example 14 | SiC: 75% + Si: 25% | Crosslinked | 10 | 10 | 1.5 | 20 | 99 | None | 15 | None |
| Example 15 | SiC: 75% + Si: 25% | Crosslinked | 10 | 10 | 5.0 | 2 | 99 | None | 38 | None |
| Example 16 | SiC: 75% + Si: 25% | Crosslinked | 5 | 10 | 10.0 | 10 | 98 | None | 41 | None |
| Example 17 | SiC: 75% + Si: 25% | Crosslinked | 10 | 10 | 0.5 | 20 | 100 | None | 8 | None |
| Example 18 | SiC: 75% + Si: 25% | Crosslinked | 10 | 10 | 1.0 | 50 | 101 | None | 12 | None |
| Example 19 | SiC: 75% + Si: 25% | Crosslinked | 10 | 45 | 1.5 | 100 | 99 | None | 15 | None |
| Example 20 | SiC: 75% + Si: 25% | Crosslinked | 10 | 45 | 1.5 | 200 | 98 | None | 14 | None |
| Example 21 | Cordierite raw material | Crosslinked | 3 | 60 | 1.5 | 50 | 101 | None | 12 | None |
| Example 22 | Cordierite raw material | Crosslinked | 10 | 45 | 2.5 | 20 | 101 | None | 20 | None |
| Example 23 | SiC: 75% + Si: 25% | Crosslinked | 10 | 10 | 11.0 | 50 | 98 | None | 44 | None |
| Example 24 | SiC: 75% + Si: 25% | Crosslinked | 10 | 10 | 1.5 | 220 | 99 | None | 9 | None |
| Example 25 | SiC: 75% + Si: 2S% | Crosslinked | 10 | 10 | 1.5 | 250 | 99 | None | 5 | None |
| Comparative Example 3 | SiC: 75% + Si: 25% | — | — | — | 1.5 | 100 | 99 | None | 3 | None |

Example 23 in which more than, 10 parts by mass of the foamed resin was added, processing efficiency decreased due to the difficulty in solidifying the clay body.

When an average particle size of the foamed resin was 2–200 μm, crushing in the foamed resin did not occur. The pore-forming effect was increased in proportion to the foamed resin added. However, in Examples 24–25 in which the foamed resin had an average particle size of 200 μm or more, crushing of the foamed resin easily occurred. The pore-forming effect was confirmed to decrease as the average particle size increased.

INDUSTRIAL APPLICABILITY

As described above, since the porous ceramic article produced according to the present invention contains crosslinked starch as a raw material, deformation during processing is small. Therefore, the porous ceramic article excels in dimensional accuracy. A Porous ceramic article having a high porosity can be obtained while suppressing production of cracks during firing by adding a foamed resin in addition to the crosslinked starch.

The invention claimed is:

1. A method for producing a porous ceramic article comprising a step of kneading raw materials including a ceramic raw material and a processing aid to prepare a clay body, a step of forming the clay body to prepare a ceramic green body, a step of drying the ceramic green body to prepare a ceramic dried article, and a step of firing the ceramic dried article to prepare a porous ceramic article, characterized in that the processing aid includes crosslinked starch that comprises at least one of starch crosslinked with phosphoric acid, starch crosslinked with epichlorohydrin, starch crosslinked with formaldehyde, starch crosslinked with acrolein, esterified starch, and etherified starch.

2. The method for producing a porous ceramic article according to claim 1, characterized in that the crosslinked starch is used in an amount of 2–30 parts by mass for 100 parts by mass of the ceramic raw material.

3. The method for producing a porous ceramic article according to claim 1, characterized in that the crosslinked starch has an average particle size of 2–100 μm.

4. The method for producing a porous ceramic article according to claim 2, characterized in that the crosslinked starch has an average particle size of 2–100 μm.

5. The method for producing a porous ceramic article according to claim 1, characterized in that the processing aid includes a foamed resin in addition to the crosslinked starch.

6. The method for producing a porous ceramic article according to claim 5, characterized in that the foamed resin is used in an amount of 0.5–10 parts by mass for 100 parts by mass of the ceramic raw material.

7. The method for producing a porous ceramic article according to claim 5, characterized in that the foamed resin has an average particle size of 2–200 μm.

8. The method for producing a porous ceramic article according to claim 6, characterized in that the foamed resin has an average particle size of 2–200 μm.

9. The method for producing a porous ceramic article according to claim 1, characterized in that the porous ceramic article has a honeycomb structure.

10. The method for producing a porous ceramic article according to claim 1, characterized in that the ceramic raw material contains one or more materials selected from the group consisting of a cordierite raw material, mullite, alumina, aluminum titanate, lithium aluminum silicate, silicon carbide, silicon nitride, and metal silicon as the main component.

11. The method for producing a porous ceramic article according to claim 1, characterized in that hardness of the clay body at 95° C. is 95% or more of hardness of the clay body at 80° C.

12. The method for producing a porous ceramic article according to claim 1, characterized in that hardness of the clay body at 95° C. is 100% or more of hardness of the clay body at 80° C.

* * * * *